(12) United States Patent
Manak

(10) Patent No.: US 7,377,017 B1
(45) Date of Patent: May 27, 2008

(54) SLIM-LINE HAND OPERATED RIVET TOOL FOR SETTING PLASTIC BLIND RIVETS IN TIGHT ACCESS SPACES

(76) Inventor: Jan Manak, 11167 Lantern Rd., Fishers, IN (US) 46038-2939

( * ) Notice: Subject to any disclaimer, the term of this patent is extended or adjusted under 35 U.S.C. 154(b) by 0 days.

(21) Appl. No.: 11/778,357

(22) Filed: Jul. 16, 2007

Related U.S. Application Data

(60) Provisional application No. 60/831,639, filed on Jul. 18, 2006.

(51) Int. Cl.
*B21J 15/34* (2006.01)
*B21D 31/00* (2006.01)

(52) U.S. Cl. ............... 29/243.521; 29/243.527; 29/525.06; 29/524.1; 72/391.4; 72/391.6

(58) Field of Classification Search ............ 29/243.521–243.529, 525.06, 524.1; 72/391.4, 72/391.6
See application file for complete search history.

(56) References Cited

U.S. PATENT DOCUMENTS 3,596,496 A * 8/1971 La Pointe .......... 29/243.521
4,088,044 A * 5/1978 Taintor ................. 475/120
4,520,648 A   6/1985 Gregory
5,361,474 A * 11/1994 Yang ................. 29/243.528
6,085,400 A * 7/2000 Liu .................. 29/243.521
6,115,900 A   9/2000 Cerulo et al.

FOREIGN PATENT DOCUMENTS

EP          0005800    *  5/1979
JP          55-1990    *  9/1980

* cited by examiner

*Primary Examiner*—David B Jones
(74) *Attorney, Agent, or Firm*—Woodard, Emhardt, Moriarty, McNett & Henry LLP

(57) ABSTRACT

A hand-operated rivet setting tool for setting blind rivets in tight access spaces. The tool has a long and slender slim-line profile which allows a user installing a vehicle bumper to set blind rivets in the space between the tire and the vehicle's wheel well without removing the tire. The tool is also characterized by a simple single pivot lever actuating mechanism for the handles that avoids the need for more complicated linkages.

5 Claims, 4 Drawing Sheets

SLIM-LINE HAND OPERATED RIVET TOOL FOR SETTING PLASTIC BLIND RIVETS IN TIGHT ACCESS SPACES

This application claims the benefit of U.S. Provisional Application Ser. No. 60/831,639, filed Jul. 18, 2006, incorporated herein by reference.

FIELD OF THE INVENTION

This invention relates generally to a hand operated rivet setting tool to facilitate the setting of plastic blind rivets in especially tight access situations such as when setting rivets in the space between the tire wheel and wheel well during the installation of vehicle bumpers.

BACKGROUND OF THE INVENTION

In many automobile maintenance and repair shops, especially body shops where repairs to damaged auto bodies are made, it is often desirable or necessary to remove and/or replace the vehicle bumpers. Part of the installation process for installing the bumpers typically requires a series of plastic blind rivets to be set to attach the bumper inside the vehicle's wheel wells. Usually, this step requires the vehicle to be place on jacks and lifted so that the tires may be removed to allow sufficient work space to be made available to permit body shop personnel to operate the rivet setting tool inside the wheel well without access being prevented by the presence of the tire. The disadvantage of this procedure is that the extra steps of jacking the vehicle, removing the tires and then reinstalling the tires and lowering the vehicle after the bumper is installed is all fairly time consuming. The result is that extra labor time is required to perform the bumper installation and the need to use the shop's repair bay which space is always at a premium in a repair shop.

While there are a number of different hand operated plastic blind rivet setting tools on the market, all are sufficiently bulky in design that they cannot be fit into the maximum several inch space between the tire and the surrounding wheel well, thus requiring the tire's removal to carry out the installation process. The design constraints are further complicated by the fact that blind rivets made of plastic require a longer pull stroke to set the rivet as opposed to comparable blind rivets made of metal materials such as steel or aluminum. One example of a hand operated plastic blind rivet setting tool is disclosed in U.S. Pat. No. 4,520,648 to Gregory. While this particular tool's design provides access to narrow spaces so long as the nose of the tool can be oriented along the direction of the restriction, this is not possible when setting rivets in the space between the tire and wheel well. Another example is disclosed in U.S. Pat. No. 6,115,900 to Cerulo et al. This tool exhibits a more bulky design required by the compound link mechanism used to provide a variable mechanical advantage for different applications.

The present invention provides an improved rivet setting tool designed to have a long and slender profile for smoothly and quickly setting plastic blind rivets into the relatively tight access space of a conventional passenger vehicle's wheel well without having to remove the tire.

SUMMARY OF THE INVENTION

It is an object of the present invention to provide a hand operated rivet-setting tool of a particularly slim-line design to permit the setting of plastic blind rivets into the relatively tight interior access space between the tire and wheel well of a conventional passenger vehicle during the installation of vehicle bumpers without removal of the tire. Further objects, features and advantages of the present invention shall become apparent from the detailed drawings and descriptions provided herein.

DETAILED DESCRIPTION

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Figure 1:
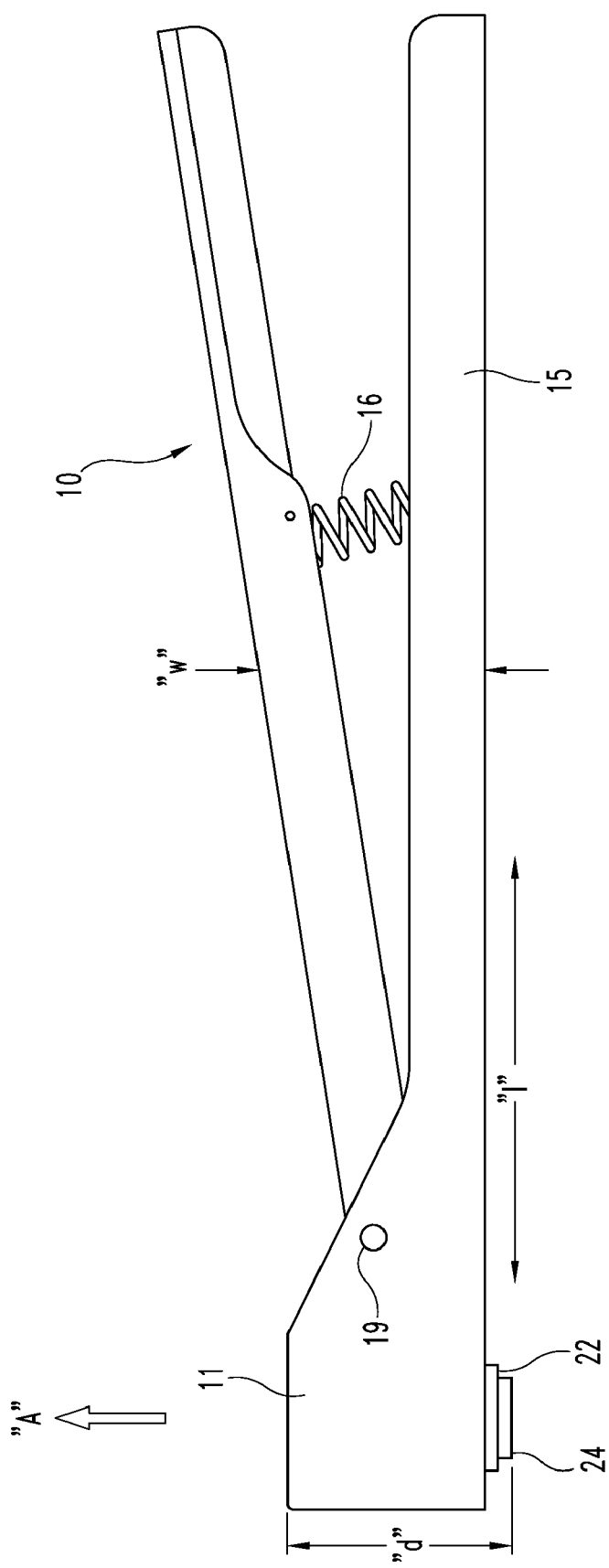
FIG. 1 is an elevation view, partially in section, showing the hand operated plastic blind rivet setting tool of the present invention in its open position.
Figure 2:
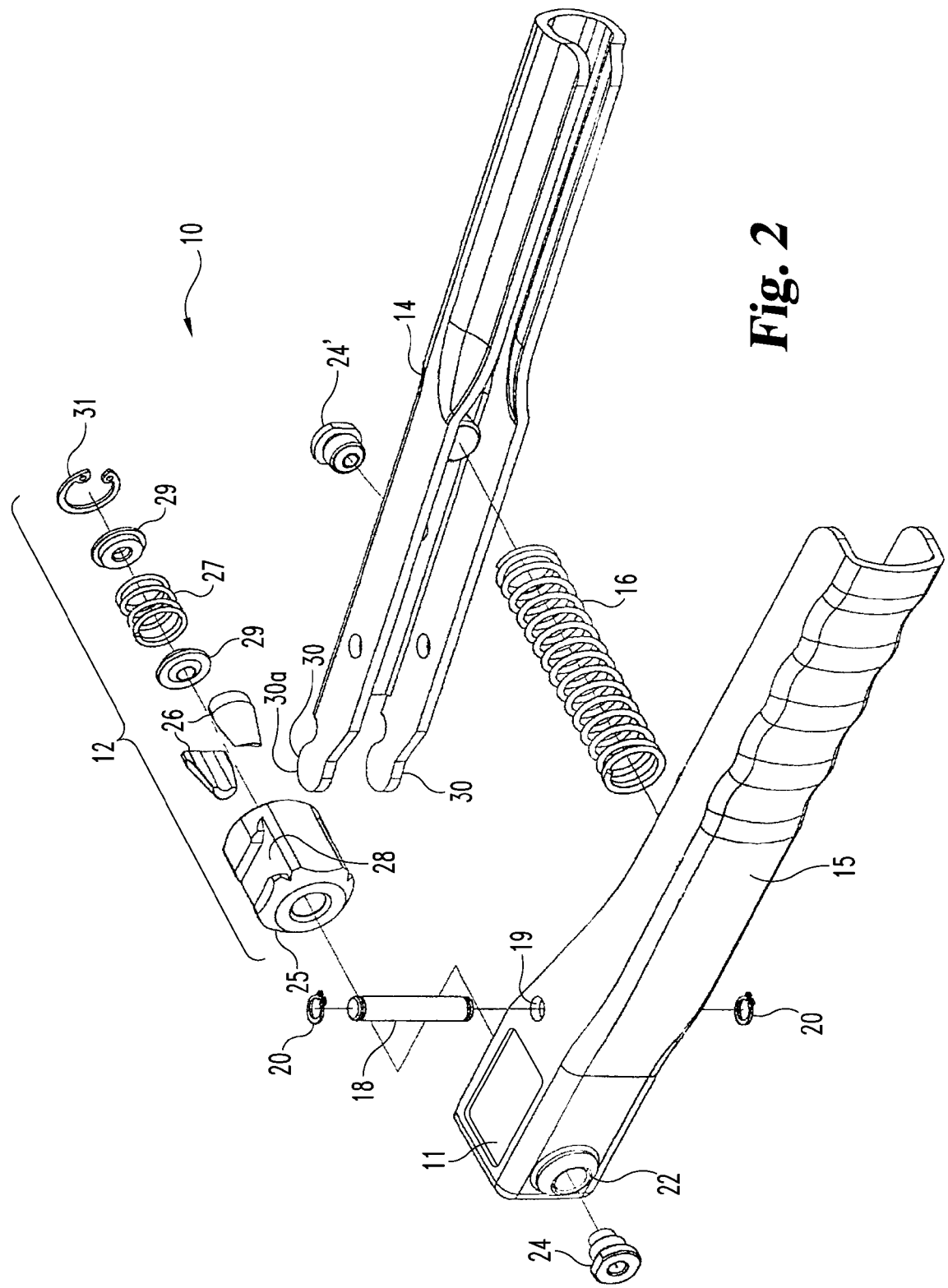
FIG. 2 is an exploded perspective view of the hand operated plastic blind rivet setting tool of the present invention.
Figure 3:
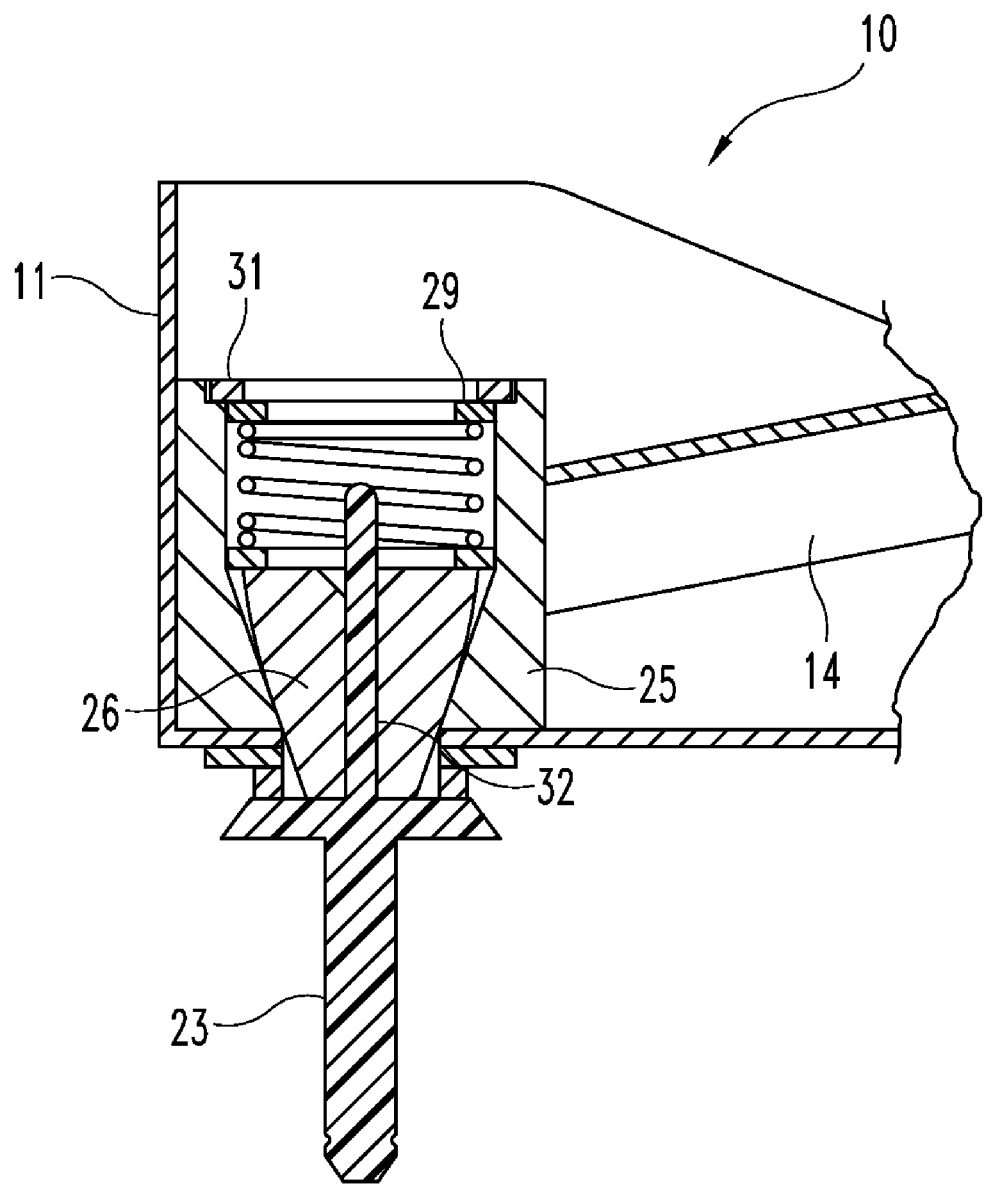
FIG. 3 is a fragmentary schematic section view, enlarged relative to FIG. 1, showing the tool with a conventional blind plastic rivet inserted therein.

A preferred embodiment of the present invention provides a hand operated rivet setting tool of an especially slim-line design to facilitate the installation of plastic rivets in the area involving the vehicle's wheel well such as in the mounting of vehicle bumpers. Illustrated in FIGS. 1-3 is one preferred embodiment of hand operated plastic blind rivet setting tool 10. Located at the rearward portion of the tool 10 is a pair of upper and lower handles 14 and 15, respectively, which are normally biased apart by a coil spring 16. The handles 14 and 15 are pivotally attached together by a pivot pin 18 held in place inside aligned apertures at fulcrum 19 by a pair of spring clips 20. At the forward end of tool 10 formed integrally with lower handle 15 is a housing 11 which slidably receives the rivet setting subassembly 12. The housing 11 is open at the top to allow for the travel of the rivet setting subassembly 12. At the lower end of housing 11 is a threaded aperture 22 which removably receives a conventionally designed nose piece 24 that accommodates a plastic blind rivet to be set using tool 10. An alternate sized nose piece 24' is housed in the lower handle 15 which may be substituted for the nose piece 24 to accommodate different sized plastic blind rivets. The rivet setting subassembly 12 includes a jaw carrier 25 in which is received a pair of jaws 26 adapted to grip the shank of a conventional plastic blind rivet 23. The jaws 26 are normally biased together by coil spring 27 captured between retaining rings 29 and secured inside the carrier 25 by a spring clip 31. The interior facing end of nose piece 24 urges against the jaws 26 with the handles 14 and 15 in their open position and forces the jaws 26 open slightly against the bias of spring 27. The carrier 25 has opposed recesses 28 (only one of which can be seen in the drawings) that receive a pair of arms 30 extending from upper handle 14 forward of the fulcrum 19.

In order to reduce the amount of space needed to operate the tool 10, the handles are oriented so that their long dimension "l" extends transverse to the profile dimension "d" at the working end of the tool 10. Further, the handles themselves have a slim-line shape such that their span or width "w" does not exceed the profile dimension "d" (or increase the profile dimension) for several inches rearward of the forward end of tool 10. The arrangement just described allows for a very slim-line profile of the tool 10 which permits it to be used in the very restricted work space between the tire 40 and wheel well 50 of a passenger vehicle 60. Typically, there is minimally only about 2 to 4 inches of workspace (shown as dimension "x" in FIG. 4) between the tire and wheel well and the tool 10 has a forward profile "d" in the area around housing 11 of only about 1 and ½ inches when the handles 14 and 15 are in their open position. Since there are a number of conventionally sized plastic rivets having a pre-setting profile length of between about ¾ to about 1 and ¼ inches, the total profile of the tool and rivet combination prior to rivet setting is within this range and can therefore access this space. When the handles are squeezed close together to actuate the setting of a rivet 23, the rivet setting subassembly 12 will move outwardly of the housing 11 in the direction of arrow "A" in FIG. 1, thereby effectively increasing the profile dimension "d" at the forward end of the tool by about ½ inch to a maximum dimension of about 2 inches. It should also be understood that the handles 14 and 15 are constructed to have a long and slender profile so that the tool 10 may be inserted into the access space at least several inches without the opened handles exceeding the forward profile "d" dimension. Preferably, the long dimension "l" is at least about 8 inches, the transverse profile dimension "d" does not exceed about 2-3 inches at the forward working end of tool 10, and the ratio between them is at least about 4 to 1, respectively. In one preferred embodiment of the depicted drawings, the long dimension "l" is about 9 and ½ inches, the transverse profile dimension "d" is about 1 and ½ inches.

In the typical operation, the plastic blind rivet body is inserted through the workpiece with the shank 32 of the rivet 23 extending into the nosepiece 24. The jaws 26 are slightly spread apart against the bias of the spring 27 to accept the shank 32 of the rivet 23. Manually squeezing together handles 14 and 15 causes the cam surface 30a on the arms 30 to raise the carrier 25 inside housing 11 and allows the jaws 26 to grip close on the shank of the rivet and exert a pulling force needed to set the rivet 23.

Figure 4:
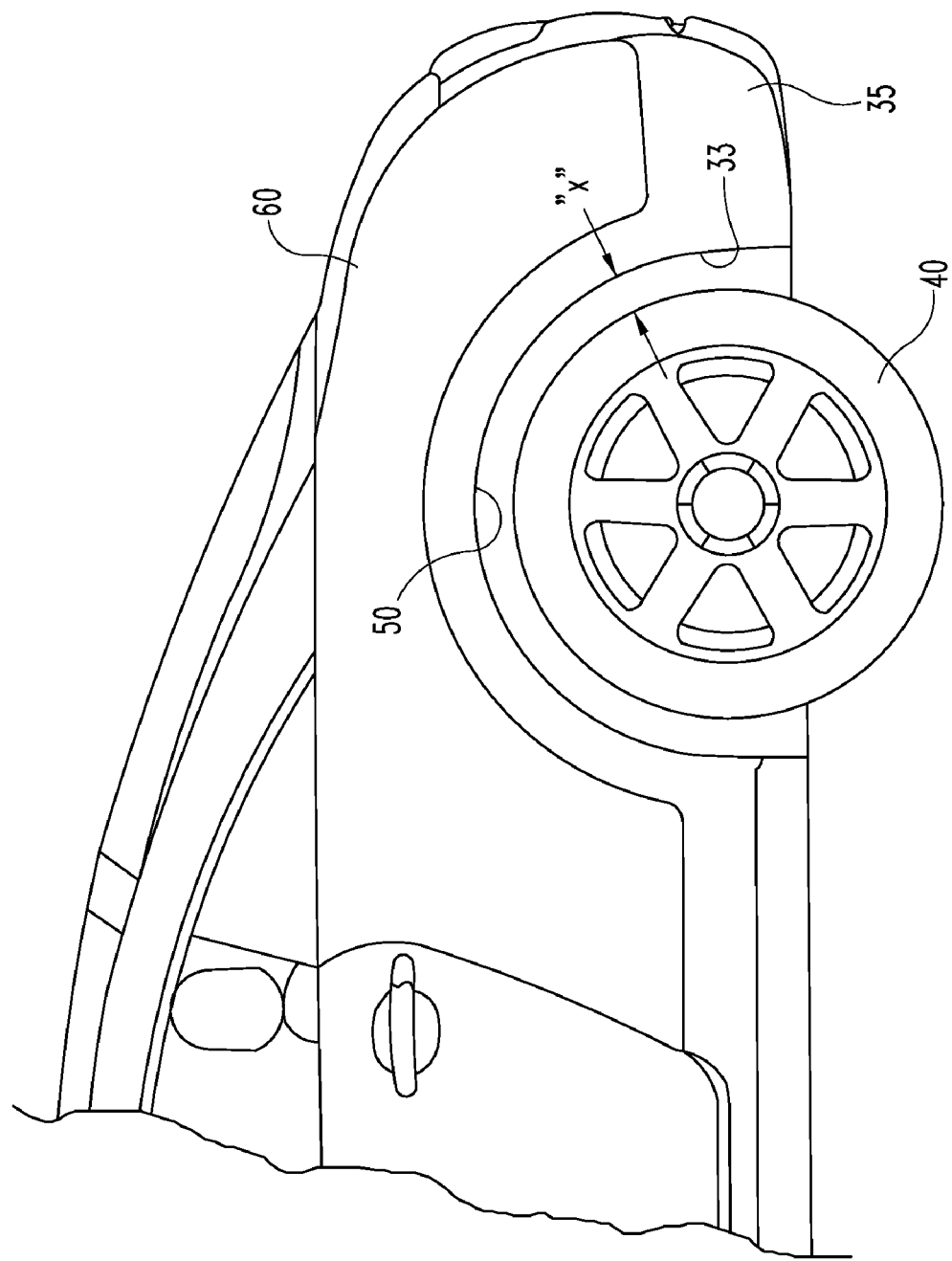
FIG. 4 is an elevation view of the rear portion of a typical passenger vehicle showing the restricted space "x" between the tire and wheel well available for inserting a rivet setting tool.

Referring now to FIG. 4, use of the present invention allows the operator to set plastic blind rivets attaching a bumper's mounting flange 33 to the vehicle body by accessing the area adjacent the wheel well 50 with the tire 40 still mounted to the vehicle 60. The result is a more easy installation of vehicle bumper 35 without having to undertake the extra steps of jacking the vehicle 60, removing the tires 50 and then reinstalling the tires and lowering the vehicle 60 after the bumper 35 is installed. The tool allows easier installation and a labor savings in installation time.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A hand-operated rivet setting tool for setting blind rivets in tight access spaces, comprising:
    upper and lower handles normally biased apart by a spring and movable between open and closed positions;
    a housing integrally formed with said lower handle at a first working end of said tool;
    a nosepiece mounted in said housing, said nosepiece for receiving therein a blind rivet;
    a rivet setting subassembly slidably mounted inside said housing, said rivet setting subassembly having a jaw carrier and a pair of jaws adapted to grip the shank of a blind rivet, said carrier being directly engaged to said upper handle whereby when said handles are closed said carrier slides within said housing and causes said jaws to grip about the shank of a blind rivet received in said nosepiece so that the shank extends axially transversely to the length of said handles;
    said rivet setting tool having a long and slender profile for accessing tight spaces, said profile having a long dimension extending along the length of said handles and a transverse dimension aligned with the axis of the shank of a blind rivet disposed in said nosepiece, said transverse dimension including said housing and said nosepiece, the ratio of said long dimension and said transverse dimension at said first working end being at least about 4 to 1, with said long dimension being at least about 8 inches and said transverse dimension not exceeding about 2-3 inches.

2. The hand-operated blind rivet setting tool of claim 1 wherein the span of said handles in the closed position does not exceed the transverse dimension of said tool at said forward working end, and wherein said long dimension is about 9 and ½ inches and said transverse dimension is about 1 and ½ inches.

3. The hand-operated blind rivet setting tool of claim 1 wherein said nosepiece is removably mounted to said housing.

4. The hand-operated blind rivet setting tool of claim 1 wherein said tool is for setting blind rivets having a plastic material construction.

5. The hand-operated blind rivet setting tool of claim 1 wherein said transverse dimension does not exceed about 1 and ½ inches when said handles are in their open position and about 2 inches when said handles are in their closed position.

* * * * *